July 6, 1965 E. R. SWANSON 3,192,828

PRINTING EASEL FOR SENSITIZED MEDIA

Filed May 29, 1962

INVENTOR.
ERNEST R. SWANSON

BY Wade Koontz and
Lawrence S. Gallo

ATTORNEYS 3,192,828
PRINTING EASEL FOR SENSITIZED MEDIA

Ernest R. Swanson, 3862 Lafayette Ave., St. Louis 10, Mo.
Filed May 29, 1962, Ser. No. 198,655
4 Claims. (Cl. 88—24)
(Granted under Title 35, U.S. Code (1952), sec. 266)

The invention described herein may be manufactured by or for the Government for governmental purposes without the payment to me of any royalty thereon.

This invention relates generally to copying easels and, in particular, to a sensitized media printing easel for a projected image.

Topographical art requires graphic and exact delineation of a region's principal features upon a map or chart. Many maps become distorted due to environmental conditions and instability of the media upon which they were printed. Media shrinkage, for instance, seldom is equal for both the longitudinal and lateral dimensions. Thus, the problem arises of transforming and restoring old maps, charts, profiles and other graphics to their true dimensional correctness or true X and Y axis relationship.

Correction may be accomplished by retaining a prescribed size of projected image in one dimension, say, along the longitudinal or Y axis, while compressing or expanding the image uniformly in another dimension, say, along the lateral or X axis. In the past, such corrections have depended upon rectifiers utilizing specialized optics and complex tipping and tilting mechanisms.

An alternate correction, the slit exposure method, is also capable of holding a prescribed size of projected image in one dimension while compressing or expanding another, however, without my invention, it is not adapted for use with present equipment and technique. This principle, briefly stated, is accomplished by exposing a sensitized medium to consecutive image segments, projected through a moving aperture slit traversing both image and medium, while simultaneously moving the medium relative to the projected image, in direction and rate resulting in a desired stretched or shortened image. My invention fills a long standing need for adapting the slit exposure principle to a high resolution transformation printer easel that is independent from the specialized optics and complex tip and tilt mechanisms associated with present rectifiers and portable for utilization with conventional equipment. Furthermore, my easel affords a convenient exposure control facilitating correction of faded and darkened areas of the image.

It is an object of this invention to provide a media printing easel wherein exposure of a projected image upon the medium may be controlled.

It is another object of this invention to provide a sensitized media printing easel capable of holding a prescribed size of projected image in one dimension while compressing or expanding the image uniformly in the other dimension.

Another object of this invention is to provide a sensitized media printing easel capable of correcting and restoring old maps and charts to their true dimensional X and Y axes relationships.

Other objects and a fuller understanding of the invention may be had by referring to the following description and claims, taken in conjunction with the accompanying drawings in which:

Figure 1:
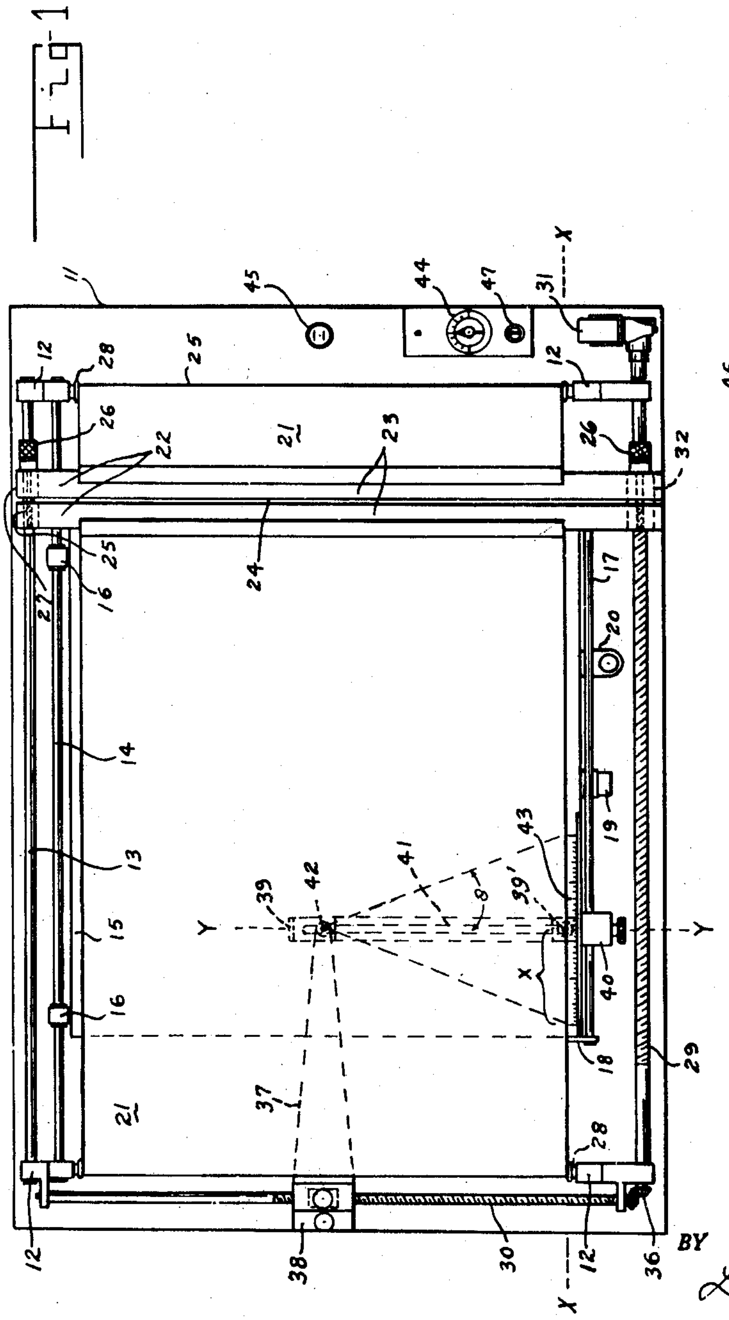
FIG. 1 is a plan view of a printing easel incorporating the invention.

Referring to the drawings, a suitable base plate 11 is provided to durably and rigidly support the affixed pairs of upright mounting brackets 12. A guideway as shown comprises a first linear guide shaft 13 and second linear guide shaft 14, attached in parallel relationship at a pair of mounting brackets 12, but may be comprised of any type of rail or similar guide, including suitable channels or grooves in the base.

A flat media holding platen 15 of any adaptable shape and material has suitable connectors such as the guide bushings 16, that loosely receive second guide shaft 14 to slidably mount and guide the platen. Third guide rail 17 is affixed to the platen 15 by brackets 18 and is loosely received by guide bushing 19 together with the self-aligning bracket 20, both extending from the base 11 as illustrated, to aid linear guidance afforded the platen 15 through guide bushings 16 and the second guide shaft 14.

A scan member is provided by the light shield curtains 21 and scan-bar 22 having bar segments 23 defining therebetween scan aperture 24. Opposing bar segments 23 are connected by threaded rod 25 having knurled head 26 which may be turned to conveniently adjust the aperture 24. Scan bar bushing 27, provided at one end of the scan-bar, loosely receives the first guide shaft 13, and slidably mounts the scan bar thereon for linear guidance. The curtains 21 may be of any suitable opaque light shielding material and may be rolled, as shown, upon parallel rollers 28 journaled between the mounting brackets 12, which are adapted to urge rolling of the curtain in a manner similar to that employed by the common window shade. The curtains 21 are easily detachable from the scan-bar segments 23 for quick access to the platen 15.

First drive shaft 29, and second drive shaft 30, suitably coupled to motor 31, provide a means for moving the scan member 22 and the platen 15. The drive shaft 29 is a threaded rod journaled in a pair of mounting brackets 12 to have parallel relationship with guide shafts 13 and 14. Threaded drive bushing 32 is provided at one end of bar segment 23 and is shown as a half nut, as it is desirable to disengage the drive bushing 32 from the drive shaft 29 for quick movement of the bar 22 during reload. Second drive shaft 30 is shown by a threaded rod journaled between pairs of mounting brackets 12 in perpendicular relationship with the first drive shaft 29. Rotational linkage between the drive shafts 29 and 30 has been provided by a pinion gear arrangement at 36, however, any suitable linkage, for instance a flexible cable, may be employed.

Impeller arm 37 is driven along second drive shaft 30 through engagement of the threaded impeller drive bushing 38. The impeller bushing 38 has also been shown as a half nut for convenient disengagement during reload.

Drive arm 39 is pivoted at end 39' to the position clamp 40, as indicated by the dashed lines in FIG. 1. Rigid attachment between drive arm 39 and platen 15 is accomplished by tightening position clamp 40, which simultaneously grasps the third guide rail 17, while locking the pivot at end 39' to the desired incline. Cam slot 41 continues throughout the length of drive arm 39 and receives drive pin 42 extending from impeller arm 37. The desired image expansion or compression will be in the direction of axis X—X, or parallel to the travel of the platen along the guide rail, as drive pin 42 traverses the route shown by axis Y—Y. Clamping drive arm 39 to form an angle $\theta$ having a value other than zero degrees between the cam slot 41 and axis Y—Y provides a cam surface in engagement with drive pin 42. Thus, as the drive pin 42 traverses the cam slot 41, it will bear against the cam surface sliding the platen 15 in a direction along axis X—X. Whereas image expansion or compression is directly related to the platen distance travelled (shown as X), and distance X being a trigonometric function of angle $\theta$ ($X=Y \tan \theta$), it is a simple matter to equate the percentage of expansion or compression upon a scale shown at 43. In this manner, the desired percentage of expansion may be set by clamping drive arm 39 at the corresponding position on the scale 43.

Figure 2:
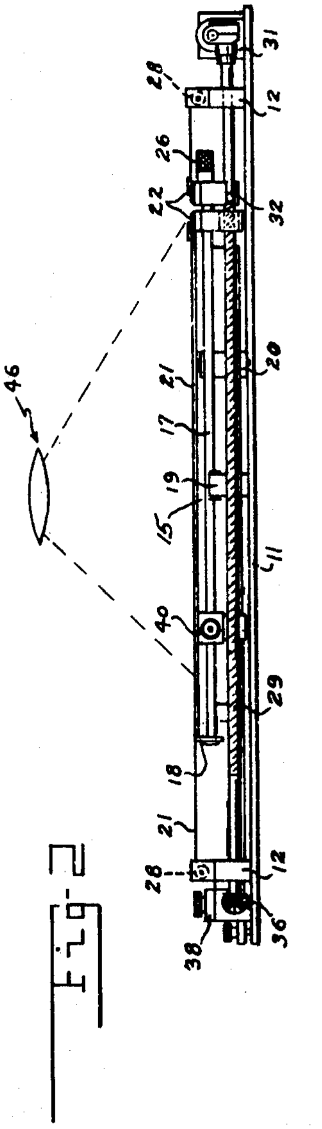
FIG. 2 is a side view of FIG. 1.

Means rotating the drive shafts 29 and 30 has been provided by variable speed motor 31 coupled through a reduction gear to the first drive shaft 29; however, any suitable means may be used to impart a desired uniform rotation. The variable motor speed control shown at 44 may be adjusted for a desired rate of scan. An electrical receptacle 45 provides power for an image projector, not shown by indicated schematically by lens 46 in FIG. 2, and may be connected along with motor 31 at master switch 47 for simultaneous operation.

Operation of the easel will be described in accordance with conventional photographic dark room procedures, however, it is understood that any image sensitized media may be employed. Scan-bar 22 is moved along its linear guide shaft 13 to the easel clear position illustrated, by lifting and disengaging the drive bushing 32 from the drive shaft 29. In a like fashion, the impeller arm 37 is disengaged and moved to the easel clear position shown. Both drive bushings 32 and 38 are replaced upon their respective drive shafts 29 and 30 for reengagement. Light-shield curtains 21 are disengaged from the scan-bar 22 and allowed to roll upon the rollers 28 thus clearing the easel. An enlarged or reduced image is projected and focused (schematically indicated at lens 46) upon the platen 15 at a desired holding scale. The desired percentage of image expansion or compression is computed and drive arm clamp 40 adjusted and set opposite the scale at the indicated percentage. In accordance with dark room technique, the projected image and other light are stopped, and a sensitized printing medium placed upon the platen and is held in position by either vacuum or tape. Light-shield curtains 21 are drawn across the medium holding platen 15 and reattached to the scan-bar 22. Motor speed is set on control dial 44 for a desired scan rate. Exposure is activated by simultaneously turning on the projector 46 and motor 31 through master switch 47.

The motor 31 rotates the drive shaft 29 which has a continuous thread engaging the threaded drive bushing 32 to drive the scan-bar 22 riding on guide bushings 27 along guide shaft 13, at the desired rate. Light-shield curtains 21 attached to the scan-bar 22 move along therewith simultaneously rolling and unrolling upon rollers 28. In this manner, only the segment of the projected image, passing through the aperture 24 is admitted to the sensitized media at a particular instant and, since the aperture 24 is moving transverse to the projected image, all segments of the projected image will be received by the sensitized medium, though not at the same instant. It can be easily demonstrated that suitable control for exposure correction is afforded by changing the rate of scan over certain dark or light areas of the projected image.

Rotational motion simultaneously continues from the first drive shaft 29 through the pinion gear arrangement 36 to the second drive shaft 30. The threaded engagement between the second drive shaft 30 and the impeller drive bushing 38 will cause the impeller arm 37 to be driven along the second drive shaft and thereby move drive pin 42 along the cam slot 41. Whenever drive arm 39 is set for 0% expansion or compression (angle $\theta$ equal to zero), the cam slot 41 presents no cam surface engaging drive pin 42 and, therefore, the platen will not be impelled to move relative to the projected image. However, when drive arm 39 is set at any other desired expansion or compression percentage on scale 43, cam slot 41 presents a cam slot to drive pin 42 which will cause the platen to move as the pin moves through the slot 41. Movement of the platen will be guided along the guide shaft 14 through bushings 16 and through guide bushing 19 and self-aligning guide bracket 20 cooperating with the third guide shaft 17. Movement of the sensitized medium relative to the projected image and the scan bar will cause the image received on the sensitized medium to be either compressed or stretched as desired.

Although a single embodiment of the present invention has been illustrated and described, it will be apparent to those skilled in the art, that various changes and modifications may be made therein without departing from the spirit of the invention or from the scope of the appended claims.

I claim:

1. A sensitized media printing easel for a projected image comprising in combination: a base having mounting brackets thereon; a linear guide shaft connected to said mounting brackets; a media-holding platen having a guide bushing affixed thereto, said guide bushing receiving said guide shaft to slidably mount said platen thereon for linear movement and guidance therealong; a scan bar having an adjustable aperture slit and a scan drive bushing; a first drive shaft journaled in said mounting brackets parallel to said guide shaft, and operatively received by said scan drive bushing for movement therealong; a second drive shaft journaled in said mounting brackets and having rotational linkage to said first drive shaft; a cam drive means for conveying motion between said second drive shaft and said platen; and means rotating said drive shafts to move said platen and said scan bar relative to each other in parallel directions.

2. A sensitized media printing easel for a projected image comprising in combination: a base having mounting brackets thereon; a first and second guide shaft connected to said mounting brackets in spaced parallel relation; a media-holding platen having a pair of guide bushings, said guide bushings receiving said second guide shaft to slidably mount said platen thereon and guide said platen relative to said base; a scan bar having an adjustable aperture slit and a scan guide bushing, said guide bushing receiving said first guide shaft to slidably mount said scan bar thereon and linearly guide said bar relative to said base and said platen; a threaded first drive shaft journaled in said mounting brackets; a threaded scan bar drive bushing connected to said bar and operatively receiving said first drive shaft in threaded engagement for movement therealong; a threaded second drive shaft journaled in said mounting brackets and having rotational linkage to said first drive shaft; an impeller arm having a threaded impeller drive bushing operatively receiving said second drive shaft in threaded engagement for movement therealong; a drive arm having a cam slot adjustably affixed to said platen with said slot at a desired incline to said second drive shaft; a drive pin affixed on said impeller arm and received within said slot for travel therein translating movement of said impeller bushing and arm along said second drive shaft into movement of said platen along said second guide shaft; and means rotating said drive shafts to move said platen and said scan bar relative to each other.

3. A sensitized media printing easel for a projected image comprising in combination; a base having mounting brackets thereon; a first and second guide shaft connected to said mounting brackets in spaced parallel relationship, a media-holding platen having a pair of guide bushings and a third guide shaft affixed thereto, said guide bushings receiving said second guide shaft to slidably mount said platen thereon; an alignment bushing and a self-adjusting guide bracket attached to said base and receiving said third guide shaft, said second and third guide shafts adapted to cooperate respectively with said bushings and guide bracket for linear guidance of said platen relative to said base; a scan bar having an adjustable aperture slit and a scan guide bushing, said scan bushing receiving said first guide shaft to slidably mount said scan bar thereon and linearly guide said bar relative to said base and said platen; a pair of light-shield curtains removably attached to said scan bar, said curtains each having a roller rotatably mounted in said mounting brackets and biased to urge rolling of said curtains upon said rollers; a threaded first drive shaft journaled in said mounting brackets; a threaded scan bar drive bushing connected to said bar and operatively receiving said first drive shaft in threaded engagement for movement therealong; a threaded second drive shaft journaled in said mounting brackets and having rotational linkage to said first drive shaft; an impeller arm including a threaded impeller drive bushing operatively receiving said second drive shaft in threaded engagement for movement therealong; a drive arm having a cam slot adjustably affixed to said platen with said slot at a desired incline to said second drive shaft; a drive pin affixed on said impeller arm and received within said slot for travel therein translating movement of said impeller bushing and arm along said second drive shaft into movement of said platen along said second guide shaft; and means rotating said drive shafts to move said platen and said scan bar relative to each other and each at a separate desired rate.

4. A sensitized media printing easel for a projected image comprising in combination: a base having a first and second pair of mounting brackets thereon; a first and second guide shaft connected to said first pair of mounting brackets in spaced parallel relationship; a media-holding platen having a pair of guide bushings and a third guide shaft affixed thereto; said guide bushings receiving said second guide shaft to slidably mount said platen thereon; an alignment bushing and a self-adjusting guide bracket attached to said base and receiving said third guide shaft, said second and third guide shafts adapted to cooperate respectively with said bushings and guide bracket for linear guidance of said platen relative to said base; a scan bar having an adjustable aperture slit and a scan guide bushing, said scan bushing receiving said first guide shaft to slidably mount said scan bar thereon and linearly guide said bar relative to said base and said platen; a pair of light shield curtains removably attached to said scan bar with said aperture slit defining therebetween a scan opening to said platen, said curtains each having a roller rotatably mounted between said pairs of mounting brackets and biased to urge rolling of said curtains upon said rollers; a threaded first drive shaft journaled in said second pair of mounting brackets, parallel to said guide shafts; a threaded scan bar drive bushing connected to said bar and operatively receiving said first drive shaft in threaded engagement for movement therealong; a threaded second drive shaft journaled between said pairs of mounting brackets, perpendicular to said guide shafts and having rotational linkage to said first drive shaft; an impeller arm having a threaded impeller drive bushing operatively receiving said second drive shaft in threaded engagement for movement therealong; a drive arm having a cam slot adjustably affixed to said platen with said slot at a desired incline to said second drive shaft; a drive pin affixed on said impeller arm and received within said slot for travel therein translating movement of said impeller bushing and arm along said second drive shaft into movement of said platen along said second guide shaft; and a motor rotating said drive shaft to move said platen and said scan-bar relative to each other and each at a separate desired rate.

References Cited by the Examiner

UNITED STATES PATENTS

| | | | |
|---|---|---|---|
| 1,182,487 | 5/16 | Huebner | 88—24 |
| 1,906,973 | 5/33 | Kingsbury | 88—24 |
| 3,115,081 | 12/63 | Bruce | 88—24 X |
| 3,126,809 | 3/64 | Adams et al. | 88—24 X |

NORTON ANSHER, *Primary Examiner.*

EMIL G. ANDERSON, WILLIAM MISIEK, *Examiners.*